(12) United States Patent
Xiao et al.

(10) Patent No.: US 9,780,361 B2
(45) Date of Patent: Oct. 3, 2017

(54) METHODS FOR FORMING POROUS MATERIALS

(71) Applicant: GM GLOBAL TECHNOLOGY OPERATIONS LLC, Detroit, MI (US)

(72) Inventors: Xingcheng Xiao, Troy, MI (US); Weidong Zhou, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 393 days.

(21) Appl. No.: 14/539,222

(22) Filed: Nov. 12, 2014

(65) Prior Publication Data

US 2016/0133918 A1 May 12, 2016

(51) Int. Cl.

| | | |
|---|---|---|
| *H01M 4/1395* | (2010.01) | |
| *H01M 4/38* | (2006.01) | |
| *H01M 4/134* | (2010.01) | |
| *H01M 4/04* | (2006.01) | |
| *C09K 13/04* | (2006.01) | |
| *C01B 33/32* | (2006.01) | |
| *H01M 10/0568* | (2010.01) | |
| *H01M 4/36* | (2006.01) | |
| *H01M 4/62* | (2006.01) | |
| *H01M 10/0569* | (2010.01) | |
| *H01M 4/02* | (2006.01) | |
| *H01M 10/052* | (2010.01) | |

(52) U.S. Cl.
CPC ....... *H01M 4/1395* (2013.01); *H01M 4/0404* (2013.01); *H01M 4/134* (2013.01); *H01M 4/386* (2013.01); *C01B 33/325* (2013.01); *C09K 13/04* (2013.01); *H01M 4/0421* (2013.01); *H01M 4/0428* (2013.01); *H01M 4/366* (2013.01); *H01M 4/62* (2013.01); *H01M 10/052* (2013.01); *H01M 10/0568* (2013.01); *H01M 10/0569* (2013.01); *H01M 2004/021* (2013.01); *H01M 2300/0028* (2013.01)

(58) Field of Classification Search
CPC .... H01M 4/1395; H01M 4/386; H01M 4/134; H01M 4/0404; H01M 4/366; H01M 4/62; H01M 4/0421; H01M 4/0428; H01M 10/0568; H01M 10/0569; H01M 10/052; H01M 2004/021; H01M 2300/0028; C09K 13/04; C01B 33/325
See application file for complete search history.

(56) References Cited

U.S. PATENT DOCUMENTS

| | | | |
|---|---|---|---|
| 5,421,958 A | 6/1995 | Fathauer et al. | |
| 9,196,896 B2 * | 11/2015 | Jung | C23C 18/54 |
| 9,209,456 B2 * | 12/2015 | Fasching | H01M 4/133 |

(Continued)

FOREIGN PATENT DOCUMENTS

| | | |
|---|---|---|
| CN | 105742585 A | 7/2016 |
| DE | 102015119214 A1 | 5/2016 |

*Primary Examiner* — Anita Alanko
(74) *Attorney, Agent, or Firm* — Harness, Dickey & Pierce, P.L.C.

(57) ABSTRACT

In an example of the method disclosed herein, $SiO_x$ ($0<x<2$) particles are combined with a lithium metal. The $SiO_x$ ($0<x<2$) particles and the lithium metal are caused to react to form lithium oxide nanoparticles in a silicon matrix. At least some of the lithium oxide nanoparticles are removed from the silicon matrix to form porous silicon particles.

20 Claims, 7 Drawing Sheets

(56) References Cited

U.S. PATENT DOCUMENTS

| | | | | |
|---|---|---|---|---|
| 9,663,860 B2* | 5/2017 | Yang | .................... | C23C 18/1275 |
| 9,673,447 B2* | 6/2017 | Chen | ...................... | H01G 11/50 |
| 2007/0224508 A1* | 9/2007 | Aramata | ............... | H01M 4/134 |
| | | | | 429/231.95 |
| 2009/0186267 A1* | 7/2009 | Tiegs | ..................... | B82Y 30/00 |
| | | | | 429/129 |
| 2011/0244328 A1* | 10/2011 | Iriyama | ................ | H01M 4/134 |
| | | | | 429/218.1 |
| 2013/0209883 A1* | 8/2013 | Park | .................... | H01M 4/0471 |
| | | | | 429/218.1 |
| 2014/0030599 A1* | 1/2014 | Lee | ....................... | H01M 4/625 |
| | | | | 429/231.8 |
| 2014/0138574 A1* | 5/2014 | Gao | ........................ | C01B 33/02 |
| | | | | 252/182.1 |
| 2014/0231724 A1 | 8/2014 | Osaka et al. | | |
| 2016/0260967 A1* | 9/2016 | Matus | ................ | H01M 4/0402 |

* cited by examiner

METHODS FOR FORMING POROUS MATERIALS

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of the method disclosed herein, the $SiO_x$ (0<x<2) particles are combined with a lithium metal. The $SiO_x$ (0<x<2) particles and the lithium metal are caused to react to form lithium oxide nanoparticles in a silicon matrix. The lithium oxide nanoparticles are removed from the silicon matrix to form porous silicon particles.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A, 1B and 1E-1G are schematic and partially cross-sectional diagrams which together illustrate one example of a method for forming a negative electrode active material;

FIGS. 1C-1G are schematic and partially cross-sectional diagrams which together illustrate another example of a method for forming a negative electrode active material;

DETAILED DESCRIPTION

Figure 1:
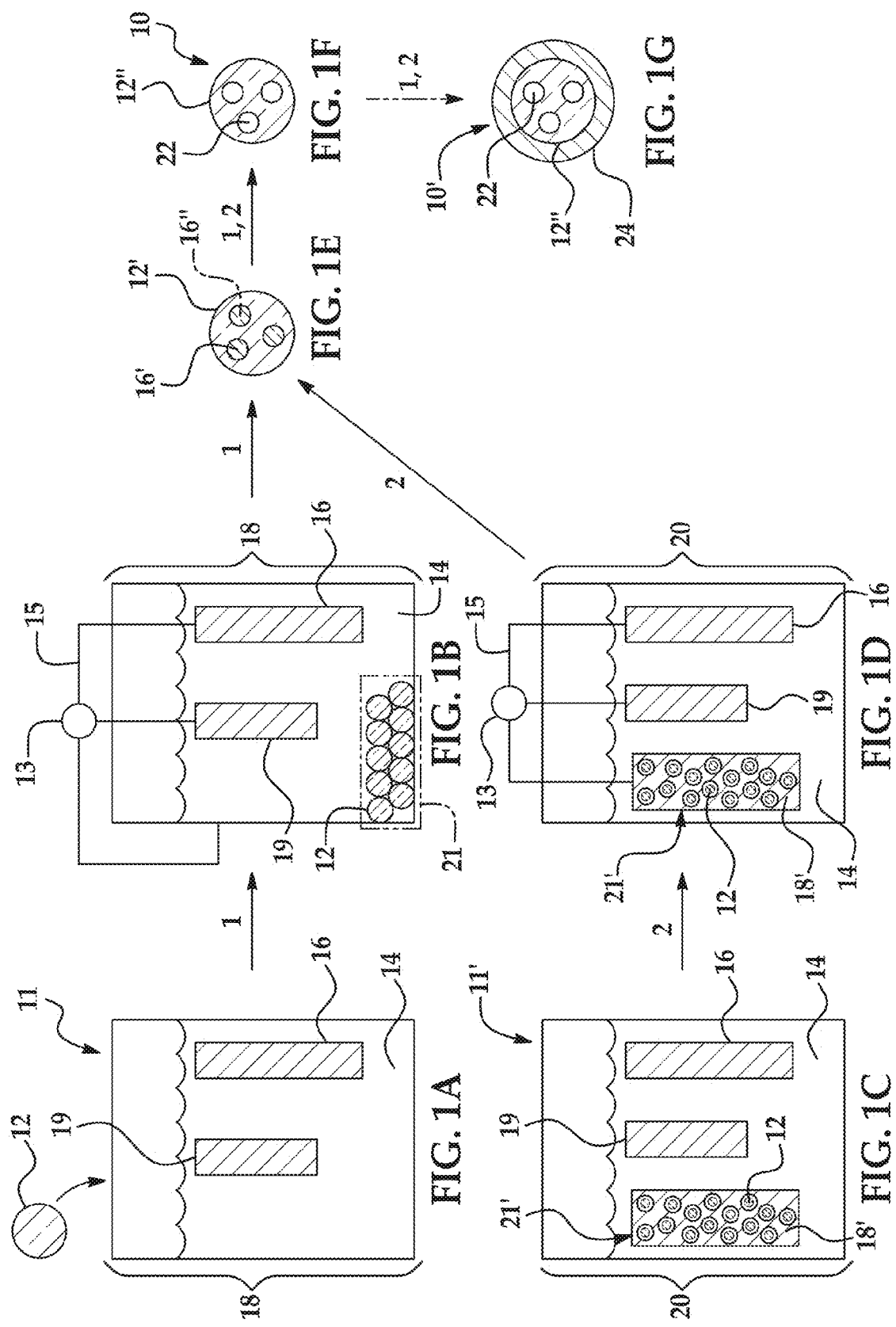

The high theoretical capacity (e.g., 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 400%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

The examples of the methods disclosed herein form silicon-based negative electrode active materials that can improve the cycling performance of the negative electrode and battery in which the materials are used. In particular, the cycling performance is improved as a result of pores that are formed within the silicon-based negative electrode active materials. These pores provide space that can accommodate the volume expansion of the silicon, and thus can reduce the stress on the silicon. It is believed that the pores within the silicon particles contribute to a reduction in fracturing, decrepitating, or mechanical degradation that would otherwise lead to the capacity fading during the charging and discharging process.

In examples of the methods disclosed herein, it is to be understood that no hydrofluoric acid is used to generate the silicon-based negative electrode active materials. Hydrofluoric acid (HF) is a corrosive contact poison. Without hydrofluoric acid, the methods disclosed herein do not involve risks associated with hydrofluoric acid, and are relatively cost effective (e.g., since specialized equipment for handling hydrofluoric acid is not necessary).

In one example of the method disclosed herein, a silicon matrix may be formed using an electrochemical cell to partially lithiate $SiO_x$ (0<x<2) particles. The lithiation reaction forms a by-product in the silicon matrix, which may be removed from the silicon matrix to form porous silicon. In another example of the method disclosed herein, the $SiO_x$ (0<x<2) particles may be mixed with a lithium metal and heated to generate the silicon matrix. Heating causes a reaction which results in the formation of a by-product in the silicon matrix, which may be removed from the silicon matrix to form porous silicon.

In the examples of the method disclosed herein, the term "matrix" refers to a surrounding medium or structure. More particularly, the matrix is silicon that is formed from a reaction that involves the $SiO_x$ (0<x<2) particles. The matrix may have any shape, including that of spherical particles, non-spherical particles, etc.

Also in the examples of the method disclosed herein, the $SiO_x$ (0<x<2) particles may be silicon monoxide, silicon suboxide, or combinations thereof.

Referring now to FIGS. 1A-1G, different examples (labeled as "1" and "2") of forming the different active materials 10, 10' are shown. It is to be understood that both active materials 10, 10' may be used as the active material (alone or in combination) in the negative electrode.

One example of the method is shown in FIGS. 1A, 1B, 1E and 1F (labeled "1"). This example of the method may also include an additional step, including a coating process as shown in FIG. 1G. This example of the method involves an electrochemical cell 11. Generally, the electrochemical cell 11 includes a working electrode 21 (shown in phantom in FIG. 1B), an electrolyte solution 14, a reference electrode 19, and a counter electrode (which, in this example, is lithium metal 16). In some instances, a separator (not shown) may also be used in the electrochemical cell 11.

In the example shown in FIGS. 1A and 1B, the $SiO_x$ ($0<x<2$) particles 12 are added to a current collector container 18. It is to be understood that the $SiO_x$ ($0<x<2$) particles 12 are in electrical contact with the current collector container 18. For example, when the $SiO_x$ ($0<x<2$) particles 12 are positioned on the bottom of the current collector container 18, the particles 12 and container 18 are in contact with each other, and when a voltage potential is applied to the container 18, the particles 12 and the container 18 are in electrical contact with each other. The combination of the current collector container 18 and the $SiO_x$ ($0<x<2$) particles 12 forms the working electrode 21.

The current collector container 18 receives and transports electrons from an external circuit 15 (shown in FIG. 1B) to the $SiO_x$ ($0<x<2$) particles 12, thereby facilitating the reduction of the $SiO_x$ ($0<x<2$) particles 12 to form the silicon matrix 12'. In an example, the current collector container 18 may be an electrically conductive metal container. In some examples, the current collector container 18 may be a copper container, copper foil, or a copper cup. In some other examples, the metal of the current collector container 18 may be a container, foil or cup selected from nickel, titanium, platinum, gold, silver, aluminum, magnesium, vanadium, and alloys thereof. While aluminum and magnesium may be used, these materials may not be selected in order to avoid side reactions (e.g., with the lithium metal 16) during the lithiation of the $SiO_x$ ($0<x<2$) particles 12.

As shown in FIG. 1A, the $SiO_x$ ($0<x<2$) particles 12 are combined with the lithium metal 16 in the electrochemical cell 11. In an example, pure lithium may be used as the lithium metal 16. In this example, the lithium metal 16 is the counter electrode, and is combined with the $SiO_x$ ($0<x<2$) particles 12 in the electrolyte solution 14. It is to be understood that when combined with each other in the electrolyte solution 14, the $SiO_x$ ($0<x<2$) particles 12 and the lithium metal 16 are positioned so that they are not physically contacting one another. In addition, the lithium metal 16 also does not physically contact the current collector container 18. As such, there is a gap between the working electrode 21 and the counter electrode/lithium metal 16.

As previously mentioned, the electrochemical cell 11 also may include the electrolyte solution 14. The electrolyte solution may be added to the current collector container 18 to neutralize the positive and negative charges that form around the working electrode 21 and counter electrode/lithium metal 16. In an example, the electrolyte solution 14 may be selected from any electrolyte solution that includes a lithium ion or lithium salt. Some examples of the electrolyte solution 14 include an ether based solvent and a lithium salt dissolved in the ether based solvent. Some examples of the ether based solvent may be 1,3-dioxolane, tetrahydrofuran, 2-methyltetrahydrofuran, 1,2-dimethoxyethane, 1,2-diethoxyethane, ethoxymethoxyethane, tetraethylene glycol dimethyl ether (TEGDME), polyethylene glycol dimethyl ether (PEGDME), and combinations thereof. Some examples of the lithium salt may be $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, and mixtures thereof.

In some other examples, the electrolyte solution 14 may be an organic based solvent and a lithium salt dissolved in the organic based solvent. Some examples of the organic based solvent may be carbonates, linear carbonates, aliphatic carboxylic esters, γ-lactones, chain structure ethers, cyclic ethers, and combinations thereof. Any of the previously listed lithium salts may be used with the organic based solvent.

In some instances, the electrochemical cell 11 includes a separator positioned between the working electrode 21 and the counter electrode/lithium metal 16. A separator (not shown in FIGS. 1A and 1B) may be used to prevent physical contact of the working electrode 21 and counter electrode/lithium metal 16 in the electrochemical cell 11.

Some examples of the separator include a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the separator may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the separator may be chosen from a combination of the polyolefin (such as PE and/or PP) and one or more of the polymers listed above.

The separator may contain a single layer or a multi-layer laminate fabricated from either a dry or wet process. For example, a single layer of the polyolefin and/or other listed polymer may constitute the entirety of the separator. As another example, however, multiple discrete layers of similar or dissimilar polyolefins and/or polymers may be assembled into the separator. In one example, a discrete layer of one or more of the polymers may be coated on a discrete layer of the polyolefin to form the separator. Further, the polyolefin (and/or other polymer) layer, and any other optional polymer layers, may further be included in the separator as a fibrous layer to help provide the separator with appropriate structural and porosity characteristics. Still other suitable separators include those that have a ceramic layer attached thereto, and those that have ceramic filler in the polymer matrix (i.e., an organic-inorganic composite matrix). In still other instances, a ceramic membrane, such as $Al_2O_3$, $Si_3N_4$, and SiC, itself may be used as the separator.

The electrochemical cell 11 may further include the reference electrode 19. The reference electrode 19 may be used to monitor the amount of current being applied to the electrochemical cell 11. By connecting the reference electrode 19 to a potentiostat 13 in the electrochemical cell 11, the reference electrode 19 is capable of measuring the amount of current being applied to the electrochemical cell 11. The reference electrode 19 measures the voltage (i.e., potential difference) between the working electrode 21 and the reference electrode 19. In an example, the voltage may be applied and maintained in an amount ranging from about 0.2 volts (V) to about 0.8 volts (V) versus the Li/Li⁺ reference electrode 19. The voltage may be applied and maintained for a time ranging from about 1 minute to about 100 hours. It is believed that the amount of time the voltage is applied to the electrochemical cell 11 depends, in part, on the $SiO_x$ (0<x<2) particle 12 size and the diffusion rate of the lithium ions. In addition, the amount of time the voltage is applied is inversely proportional to the intensity of the current. In an example, the time for holding the voltage may be determined by measuring the initial current when the voltage is applied, and then stopping the voltage application when the current is $\frac{1}{100}^{th}$ of the initially measured current.

Referring now to FIG. 1B, an external circuit 15 may be connected to the working electrode 21 (i.e., the current collector container 18 in contact with the $SiO_x$ (0<x<2) particles 12), the counter electrode/lithium metal 16, and the reference electrode 19. The external circuit 15 is used to connect the working electrode 21, the reference electrode 19, and to the counter electrode/lithium metal 16. It is to be understood that the three electrodes (i.e., the counter electrode/lithium metal 16, the working electrode 21, and the reference electrode 19) are connected to the potentiostat 13. The reference electrode 19 maintains the same potential even if some current is flowing through it. In this electrochemical cell 11, the potential difference between working electrode 21 and reference electrode 19 is registered or controlled, while the current flows mainly between the working electrode 21 and the counter electrode/lithium metal 16. The external circuit 15 may be operatively connected to the potentiostat 13, which applies the voltage, and supplies the electrical current, from a power supply (not shown).

The current resulting from the voltage application causes lithium ions to dissolve (or de-plate) from the counter electrode/lithium metal 16. These ions are carried through the electrolyte solution 14 towards the working electrode 21. The lithium ions are alloyed with the $SiO_x$ (0<x<2) particles 12 by a conversion reaction with the electrolyte. This reaction lithiates the $SiO_x$ (0<x<2) particles 12. It is believed that a reduction reaction may occur between the $SiO_x$ (0<x<2) particles 12 and the lithium ions to form the silicon matrix 12' (shown in FIG. 1E). More particularly, the reduction reaction reduces the $SiO_x$ (0<x<2) particles 12 to form the silicon matrix 12', and the lithium ions react with the oxygen to form lithium oxide nanoparticles 16' within the silicon matrix 12' (shown in FIG. 1E). As such, the silicon matrix 12' includes lithium oxide nanoparticles 16' therein. During the reduction of the $SiO_x$ (0<x<2) particles 12, the following reaction (I) may occur:

(I)

In some instances, an oxidation reaction, shown as reaction (II), may also occur:

(II)

As the voltage application continues, the lithium oxide 16' may react with the $SiO_x$ (0<x<2) particles 12 and the lithium ions to form lithium silicate nanoparticles 16". Whether reaction (II) occurs depends, in part, on the amount of the $SiO_x$ (0<x<2) particles 12 used in the electrochemical cell 11 and the amount of time the voltage is applied to the electrochemical cell 11.

Referring now to FIG. 1E, after the voltage has been applied for a suitable time, the silicon matrix 12' may be formed with lithium oxide nanoparticles 16' and, in some instances, lithium silicate nanoparticles 16" therein.

The silicon matrix 12' having lithium oxide nanoparticles 16' and, in some instances, lithium silicate nanoparticles 16" therein may be exposed to a removal process that extracts or otherwise remove the lithium oxide nanoparticles 16' and, in some instances, the lithium silicate nanoparticles 16" from the silicon matrix 12'. This removal process generates the porous silicon particles 12", as shown in FIG. 1F. Examples of the removal process are discussed further hereinbelow.

Another example of the method is shown in FIGS. 1C, 1D, 1E and 1F (labeled "2"). This example of the method may also include an additional step, including a coating process as shown in FIG. 1G. This example of the method involves another electrochemical cell 11'. Generally, the electrochemical cell 11' includes the working electrode 21', the electrolyte solution 14, the reference electrode 19, and the counter electrode (which, in this example, is also lithium metal 16). In some instances, the separator (not shown) may also be used in the electrochemical cell 11'.

In the example shown in FIGS. 1C and 1D, the $SiO_x$ (0<x<2) particles 12 are added to a porous current collector 18'. The $SiO_x$ (0<x<2) particles 12 are positioned within pores of the porous current collector 18'. When the $SiO_x$ (0<x<2) particles 12 are positioned within the pores of the porous current collector 18', the particles 12 and porous current collector 18' are in contact with each other, and when a voltage potential is applied to the porous current collector 18', the particles 12 and the porous current collector 18' are in electrical contact with each other. The porous current collector 18' with the $SiO_x$ (0<x<2) particles 12 therein functions as the working electrode 21'.

It is to be understood that the electrolyte solution 14, the reference electrode 19, the lithium metal 16, and the separator may be the same materials as previously described in reference to FIG. 1A. Furthermore, the electrolyte solution 14, the reference electrode 19, the lithium metal 16, and the separator when used, may be incorporated in the electrochemical cell 11' in the same manner as the electrochemical cell 11 described in FIG. 1A. In this example, it is to be understood that the container 20 of the electrochemical cell is not a current collector and is some non-conductive material (e.g., a non-conductive polymer, glass, etc.).

The porous current collector 18' receives and transports electrons from an external circuit 15 (shown in FIG. 1D) to the $SiO_x$ (0<x<2) particles 12 within the porous current collector 18', thereby reducing the $SiO_x$ (0<x<2) particles 12 to form the silicon matrix 12'. In an example, the porous current collector 18' may be a conductive porous metal. Some examples of the conductive porous metal include porous copper, nickel, titanium, platinum, gold, silver, aluminum, magnesium, vanadium, or alloys thereof. As noted above, aluminum and magnesium may not be used in order to avoid side reactions with the lithium metal 16. In an example, the porous current collector 18' is porous copper.

Referring to FIG. 1D, an external circuit 15 may be connected to the working electrode 21' (i.e., the porous current collector 18' with the $SiO_x$ (0<x<2) particles 12 therein), the counter electrode/lithium metal 16, and the reference electrode 19 as previously described in reference to FIG. 1B. In this example, the external circuit 15 may also be operatively connected to the potentiostat 13, which applies the voltage, and supplies the electrical current, from a power supply (not shown).

The current resulting from the voltage application causes the lithium ions to react with the $SiO_x$ ($0<x<2$) particles 12 as previously described in FIG. 1B. The same reaction(s) (I), (II) occur that result in the formation of the silicon matrix 12', the lithium oxide nanoparticles 16', and, in some instances, the lithium silicate nanoparticles 16", as shown in FIG. 1E.

In another example, not shown in FIGS. 1A-1E, a two electrode cell configuration may be used. In the two electrode cell configuration, the counter electrode/lithium metal 16 may also function as the reference electrode 19. The voltage may be measured at the counter electrode/lithium metal 16 as previously described in reference to FIGS. 1B and 1D using a potentiostat 13.

The silicon matrix 12' having the lithium oxide nanoparticles 16', and, in some instances, the lithium silicate nanoparticles 16" therein may be removed from the electrochemical cell and exposed to additional processing.

Referring now to FIG. 1F (which may be used in both methods 1 and 2), at least some of the lithium oxide nanoparticles 16' may be removed from the silicon matrix 12'. When present, at least some of the lithium silicate nanoparticles 16" may or may not be removed. In an example, the silicon matrix 12' includes lithium oxide nanoparticles 16' alone, and the removal process may involve exposure to water and/or ethanol. In another example, the silicon matrix 12' includes both lithium oxide nanoparticles 16' and lithium silicate nanoparticles 16", and the removal process may involve exposure to water and/or ethanol. In still another example, the silicon matrix 12' includes both lithium oxide nanoparticles 16' and lithium silicate nanoparticles 16", and the removal process may involve exposure to water and/or ethanol, and then exposure to a diluted acid. In yet a further example, the silicon matrix 12' includes both lithium oxide nanoparticles 16' and lithium silicate nanoparticles 16", and the removal process may involve exposure to a diluted acid.

In an example, at least some of the nanoparticles 16' are removed from the silicon matrix 12' by exposing the silicon matrix 12' to deionized water, ethanol, or a combination thereof. In an example, the amount of liquid (water and/or ethanol) used for removal may be present in a ratio of at least 1:1 of the liquid to the $SiO_x$ ($0<x<2$) particles 12. In some instances, more liquid than $SiO_x$ ($0<x<2$) particles 12 is desirable. The water, ethanol, or combination thereof leaches the nanoparticles 16' from the silicon matrix 12'. As a result of the extraction of the nanoparticles 16' from the matrix 12', solid porous silicon particles 12" are formed. These particles 12" are present in a dispersion with the water and/or ethanol. Pores 22 are formed within the silicon particles 12" due to the removal of the nanoparticles 16' therefrom. The pores 22 are present in spaces in the silicon that were previously occupied by the nanoparticles 16'.

In an example of this removal process, when water is added to the silicon matrix 12" having the nanoparticles 16' therein, the following reaction (III) may occur:

$$Li_2O+H_2O \rightarrow 2LiOH \quad \text{(III)}$$

In this example, the lithium hydroxide by-product formed from reaction (III) is soluble in water. The soluble by-products make the isolation of the porous silicon particles 12" from the dispersion relatively simple, because filtration, ultrasonication, or centrifugation techniques may be used.

It is to be understood that if the lithium silicate nanoparticles 16" are present, exposure to water and/or ethanol will not remove these particles 16". As such, the lithium silicate nanoparticles 16" may remain in the porous silicon particles 12" after at least some of the nanoparticles 16' are removed, or an additional process may be performed to remove at least some of the lithium silicate nanoparticles 16".

As such, in one example, after at least some of the nanoparticles 16' are removed and the porous silicon particles 12" are formed, the porous silicon particles 12" may be exposed to a dilute acid in order to remove at least some of the lithium silicate nanoparticles 16" and create additional pores 22. In this example, the dilute acid etches at least some of the nanoparticles 16" from the porous silicon particles 12". Some examples of the dilute acid include less than 1M hydrochloric acid (HCl), less than 1M sulfuric acid ($H_2SO_4$), less than 1M nitric acid ($HNO_3$), less than 1M phosphoric acid ($H_3PO_4$), or combinations thereof. Water may also be added to further dilute the acid. In an example, the amount of acid added during the removal process is equal to the amount of water added.

In one example of this removal process, when dilute HCl is added to the silicon matrix 12" having at least some of the nanoparticles 16' removed and having the nanoparticles 16" therein, the following reaction (IV) may occur:

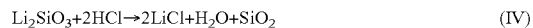

$$Li_2SiO_3+2HCl \rightarrow 2LiCl+H_2O+SiO_2 \quad \text{(IV)}$$

In this example, the lithium chloride by-product that forms in reaction (IV) may be soluble in water. It is believed that the silicon dioxide by-product forms small particles within (loosely connected to) the silicon matrix 12' that may be suspended in the acid or acid and water. The soluble lithium chloride and the small silicon dioxide particles make the isolation of the porous silicon particles 12" from the dispersion relatively simple, because filtration, ultrasonication, or centrifugation techniques may be used.

In yet another example, at least some of the lithium oxide and at least some of the lithium silicate nanoparticles 16', 16" may be removed from the silicon matrix 12' by exposing the silicon matrix 12' to the dilute acid. Any of the previously described dilute acids may be used. The dilute acid etches the nanoparticles 16', 16" from the silicon matrix 12'. As a result of etching, solid porous silicon particles 12" are formed. The solid porous silicon particles 12" are present in a dispersion (not shown). This dispersion includes at least some liquid and the solid porous silicon particles 12". The etching of the nanoparticles 16', 16" forms the pores 22 within the silicon particles 12". As previously described, the pores 22 are present in spaces in the silicon previously occupied by the nanoparticles 16', 16".

In an example of this removal process, when dilute HCl is added to the silicon matrix 12" having the nanoparticles 16', 16" therein, the following reactions (V), (VI) may occur:

$$Li_2O+HCl \rightarrow 2LiCl+H_2O \quad \text{(V)}$$

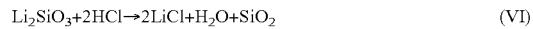

$$Li_2SiO_3+2HCl \rightarrow 2LiCl+H_2O+SiO_2 \quad \text{(VI)}$$

In this example, the lithium chloride by-product that forms in reaction(s) (V), (VI) may be soluble in water. It is believed that the silicon dioxide by-product forms small particles within the silicon matrix 12' that may be suspended in the acid or acid and water. The soluble lithium chloride and the small silicon dioxide particles make the isolation of the porous silicon particles 12" from the dispersion relatively simple, because filtration, ultrasonication, or centrifugation techniques may be used.

When the porous current collector 18' is used, it is to be understood that the porous silicon particles 12" may be removed from the porous current collector 18' during the nanoparticle 16', 16" removal process (i.e., leaching or etching) previously described using any suitable technique, such as, ultrasonic vibration. The porous silicon particles 12" may then be collected or otherwise separated from the remainder of the dispersion components using any suitable technique.

In an example, after the porous silicon particles 12" are formed in the dispersion, the particles 12" may be isolated from the dispersion using any suitable technique. If the by-products of any reaction are soluble in the liquid of the dispersion, filtration may be used to isolate the particles 12". Other suitable isolation techniques include centrifugation or exposure to ultrasonic waves. In an example, centrifugation is used to aggregate the porous silicon particles 12' and separate them from the other components of the dispersion. Then, the porous silicon particles 12" may be collected using vacuum filtration. The collected silicon particles 12" may be rinsed. Upon isolation of the porous silicon particles 12" from the dispersion, the negative electrode active material 10 is formed.

The pores 22 of the negative electrode active material 10 enhance the life cycle of the lithium batteries by providing space that can accommodate silicon particle 12" volume expansion, and thus reducing fracturing, decrepitating, or mechanical degradation of the active material 10.

Turning to FIG. 1G, an electrically conductive coating 24 may be applied to the porous silicon particles 12". The electrically conductive coating 24 enhances the conductivity of the negative electrode active material 10. In an example, the electrically conductive coating 24 may be graphitic carbon. In another example, the electrically conductive coating 24 may be a nitride based coating, such as aluminum nitride (AlN), titanium nitride (TiN), vanadium nitride (VN), or combinations thereof.

In an example, the electrically conductive coating 24 may be applied using any suitable technique. For example, the electrically conductive coating 24 may be applied using chemical vapor deposition (CVD) or atomic layer deposition (ALD). In an example, the thickness of the coating 24 ranges from about 0.5 nm to about 10 nm. The application of the electrically conductive coating 24 forms the negative electrode active material 10'.

Figure 2:
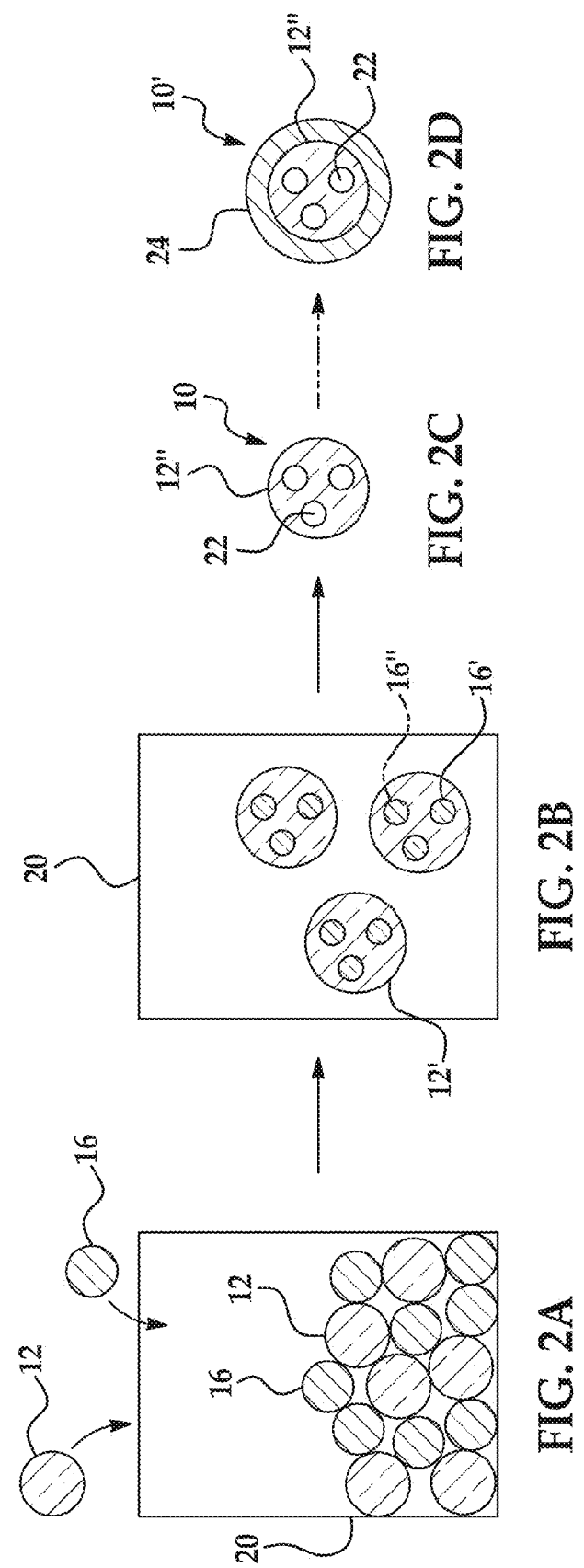
FIGS. 2A-2D are schematic and partially cross-sectional diagrams which together illustrate yet another example of a method for forming a negative electrode active material.

Referring now to FIGS. 2A-2D, another example of the method for forming the negative electrode active material 10, 10' is shown. In FIG. 2A, the $SiO_x$ (0<x<2) particles 12 mixed with lithium metal particles 16 in a container 20. In an example, a ratio of the $SiO_x$ (0<x<2) particles 12 to lithium metal particles 16 is about 1:2X, where X equals x in $SiO_x$. For example, X=x, where 0<x<2. In an example, x, and thus X, are determined using chemical analysis.

The $SiO_x$ (0<x<2) particles 12 and lithium metal particles 16 may be mixed using any suitable method, such as ball milling. In some examples, the particles 12, 16 are mixed and then heated, and in other examples, the particles 12, 16 and mixed and heated simultaneously. Heating takes place at a temperature greater than 100° C. Mixing and/or heating may take place in argon or another inert atmosphere. It is to be understood that mixing may also take place in other, non-inert atmospheres, but heating takes place in inert atmospheres.

The heating of the mixture is an alloying process, and causes the reaction (I), and in some instances reaction (II), previously described herein. As such, the silicon particles 12' are formed with the lithium oxide nanoparticles 16' and, in some instances, the lithium silicate nanoparticles 16" therein, as shown in FIG. 2B.

In FIG. 2C, at least some of the lithium oxide nanoparticles 16' and, in some instances, at least some of the lithium silicate nanoparticles 16", are removed from the silicon particles 12' using any of the techniques previously described in reference to FIG. 1F. Removal of at least some of the particles 16' (and in some instances 16") forms silicon particles 12" having pores 22 therein. In addition, the silicon particles 12" are isolated using any of the techniques previously described in reference to FIG. 1F. These processes form the negative electrode active material 10.

Turning to FIG. 2D, the electrically conductive coating 24 may be added to the silicon particles 12" as previously described in reference to FIG. 1G. The examples of the electrically conductive coating 24 described herein may also be used in this example. The silicon particles 12' with the electrically conductive coating 24 thereon form the negative electrode active material 10'.

Figure 3:
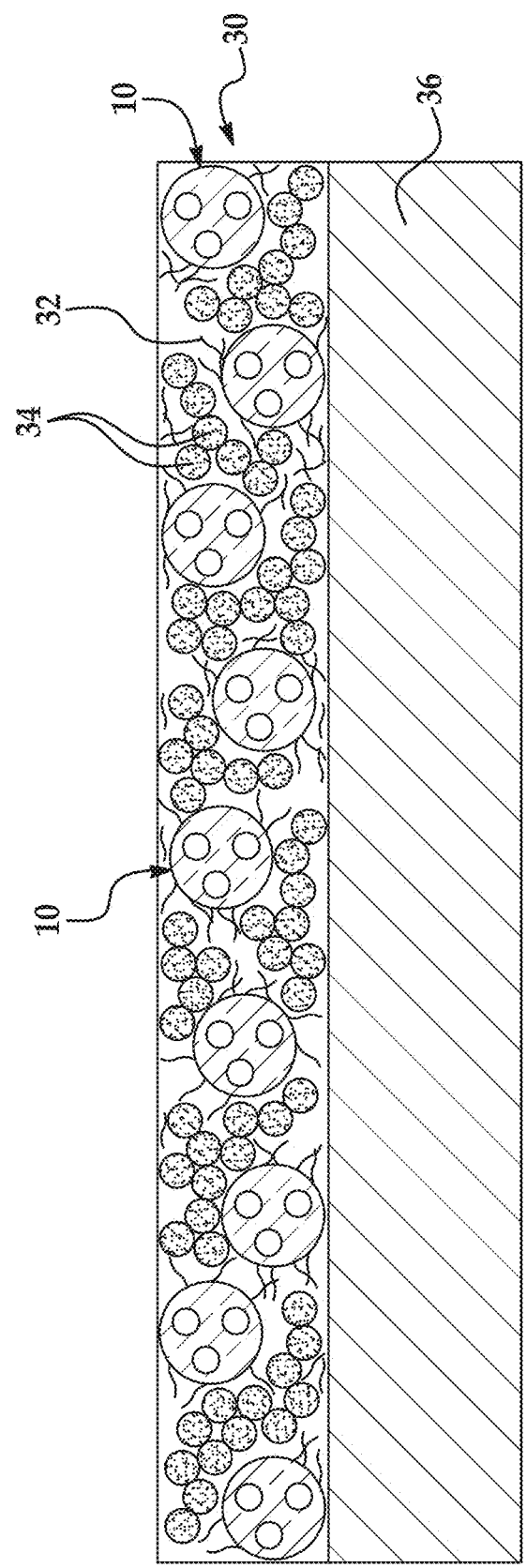
FIG. 3 is a cross-sectional view of an example of a negative electrode on a current collector.

An example of the method for preparing the negative electrode 30 will now be discussed in reference to FIG. 3. It is to be understood that the active material 10, 10' formed from the methods disclosed herein may each be used individually, or in combination, as the active material in the negative electrode 30. FIG. 3 depicts an example of the negative electrode 30, including the active material 10, a binder 32, and a conductive filler 34, on a support 36.

In examples of preparing the negative electrode 30, the active material 10, 10' is mixed with other negative electrode components to form a dispersion or slurry. Examples of the other negative electrode components may include the binder 32 and the conductive filler 34.

In an example of preparing the dispersion or slurry, the binder 32 is mixed into a solvent to form a solution. Examples of the binder 32 may include polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders.

Suitable examples of the solvent that may be mixed with the binder 32 to form the solution may include a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water.

The conductive filler 34 may also be added to the solution including the binder 32 and the solvent. The conductive filler 34 may be a high surface area carbon, such as acetylene black (i.e., carbon black). Other examples of suitable conductive fillers, which may be used alone or in combination with carbon black, include graphene, graphite, carbon nanotubes, and/or carbon nanofibers. One specific example of a combination of conductive fillers is carbon black and carbon nanofibers. The conductive filler 34 is included to ensure electron conduction between a negative-side current collector (i.e., support 36) and the active material 10, 10', and between the active material 10, 10' particles themselves.

Once the active material 10, 10' is added to the solution to form a dispersion or slurry, the dispersion/slurry may include the solvent, the binder 32, the active material 10, 10' and the conductive filler 34. The amount of solvent that is included in the dispersion/slurry will depend upon the concentration of the binder 32 in the solution and the amount of binder solution used in the slurry. In one example of the dispersion/slurry, the amount of the active material 10, 10' ranges from about 50 wt % to about 90 wt % (based on total solid wt % of the dispersion/slurry), the amount of the conductive filler 34 ranges from about 5 wt % to about 25 wt % (based on total solid wt % of the dispersion/slurry), and the amount of the binder 32 ranges from about 5 wt % to about 25 wt % (based on total solid wt % of the dispersion/slurry). Some specific examples weight ratios of active material:binder:filler include 50:25:25, 60:20:20, 70:15:15, 75:12.5:12.5, 80:10:10, and 90:5:5. While each of the binder 32 and filler 34 is present in the same amount in these examples, it is to be understood that the amounts of these two components may vary.

After all the components are added to form the dispersion/slurry, the dispersion may be mixed manually or by milling. Milling aids in transforming the dispersion/slurry into a coatable mixture. Low-shear milling or high-shear milling may be used to mix the dispersion/slurry. The dispersion/slurry milling time ranges from about 10 minutes to about 3 hours depending on the milling shear rate. In an example, a planetary mixer is used for about 30 minutes to mill the dispersion/slurry.

The dispersion is then deposited onto a support 36. In an example, the support 36 is a negative-side current collector. It is to be understood that the support 36 may be formed from copper or any other appropriate electrically conductive material known to skilled artisans. The support 36 that is selected should be capable of collecting and moving free electrons to and from an external circuit connected thereto.

The dispersion may be deposited using any suitable technique. As examples, the dispersion may be cast on the surface of the support 36, or may be spread on the surface of the support 36, or may be coated on the surface of the support 36 using a slot die coater.

The deposited dispersion may be exposed to a drying process in order to remove any remaining solvent. Drying may be accomplished using any suitable technique. Drying may be performed at an elevated temperature ranging from about 60° C. to about 150° C. In some examples, vacuum may also be used to accelerate the drying process. As one example of the drying process, the deposited dispersion may be exposed to vacuum at about 120° C. for about 12 to 24 hours.

The drying process results in a coating formed on the surface of the support 36. In an example, the thickness of the dried slurry (i.e., coating) ranges from about 5 μm to about 100 μm. Drying removes the solvent, and thus the weight percentages of the solids previously provided for the slurry/dispersion is the same for the final negative electrode 30.

An electrically conductive coating (similar to electrically conductive coating 24) may be applied to the surface of a lithium battery negative electrode 30. This coating may be used if the electrode 30 includes the coated active material 10'. The same methods (e.g., CVD and ALD) disclosed above for forming the electrically conductive coating 24 may be used to form the electrically conductive coating on the electrode 30.

In some examples, the negative electrode 30 may be paired with a lithium electrode. In an example, the negative electrode 30 including the active material 10, 10' may be paired with lithium metal to form a half-cell.

Prior to being used in the lithium ion battery 50 (FIG. 4) or the lithium-sulfur battery 60 (FIG. 5), the examples of the negative electrode 30 disclosed herein may be pre-lithiated. Pre-lithiation may be particularly desirable when the negative electrode 30 is to be used in the lithium-sulfur battery 60. In an example, the negative electrode 30 is pre-lithiated using a lithium-silicon (Li—Si) half cell method. In another example, the negative electrode 30 may be pre-lithiated by short circuiting lithium-silicon having a pre-lithiation electrolyte positioned therebetween. This may be accomplished for a time period ranging from about 1 hour to about 24 hours.

Figure 4:
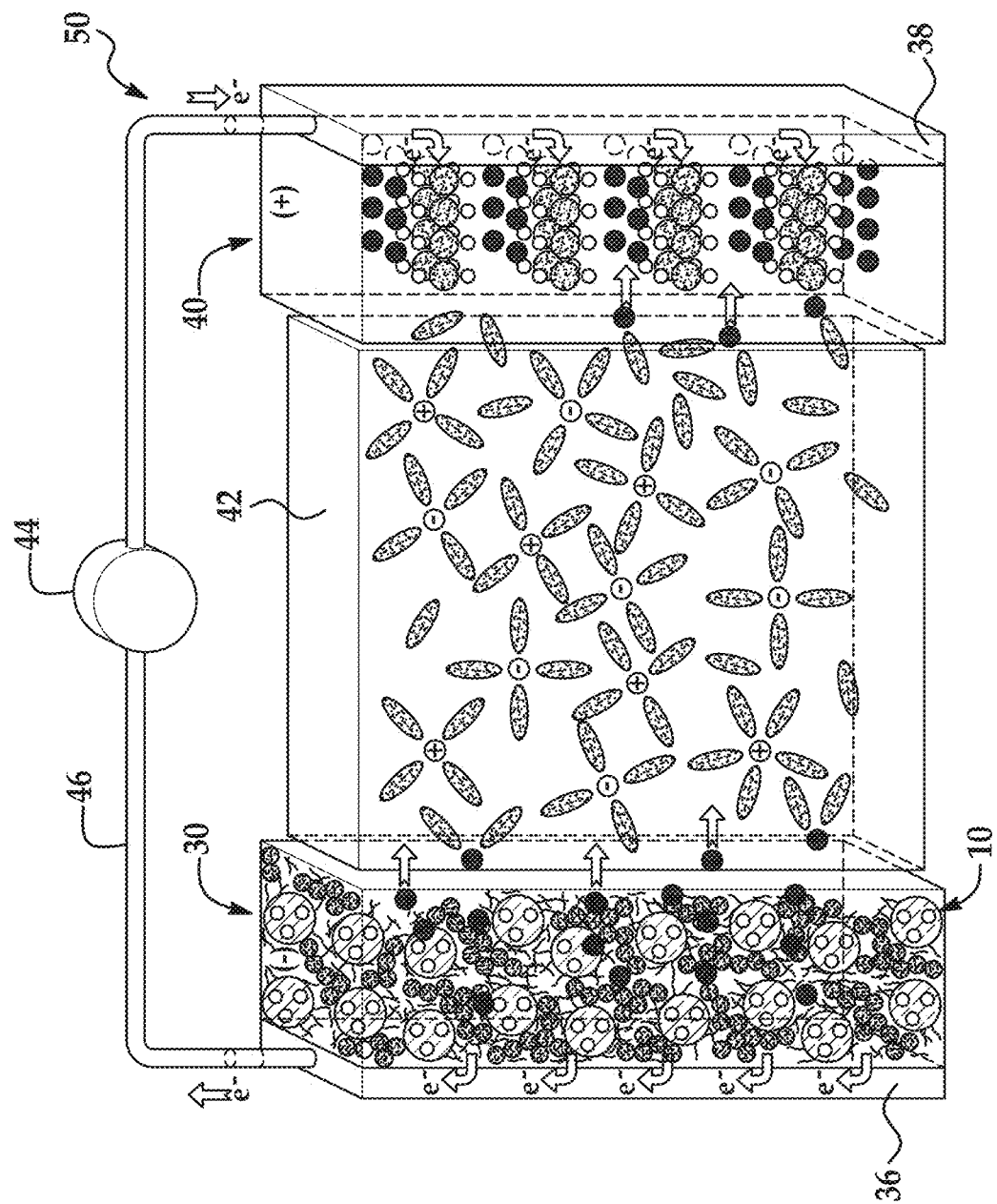
FIG. 4 is a perspective schematic view of an example of a lithium ion battery, including an example of the negative electrode disclosed herein.
Figure 5:
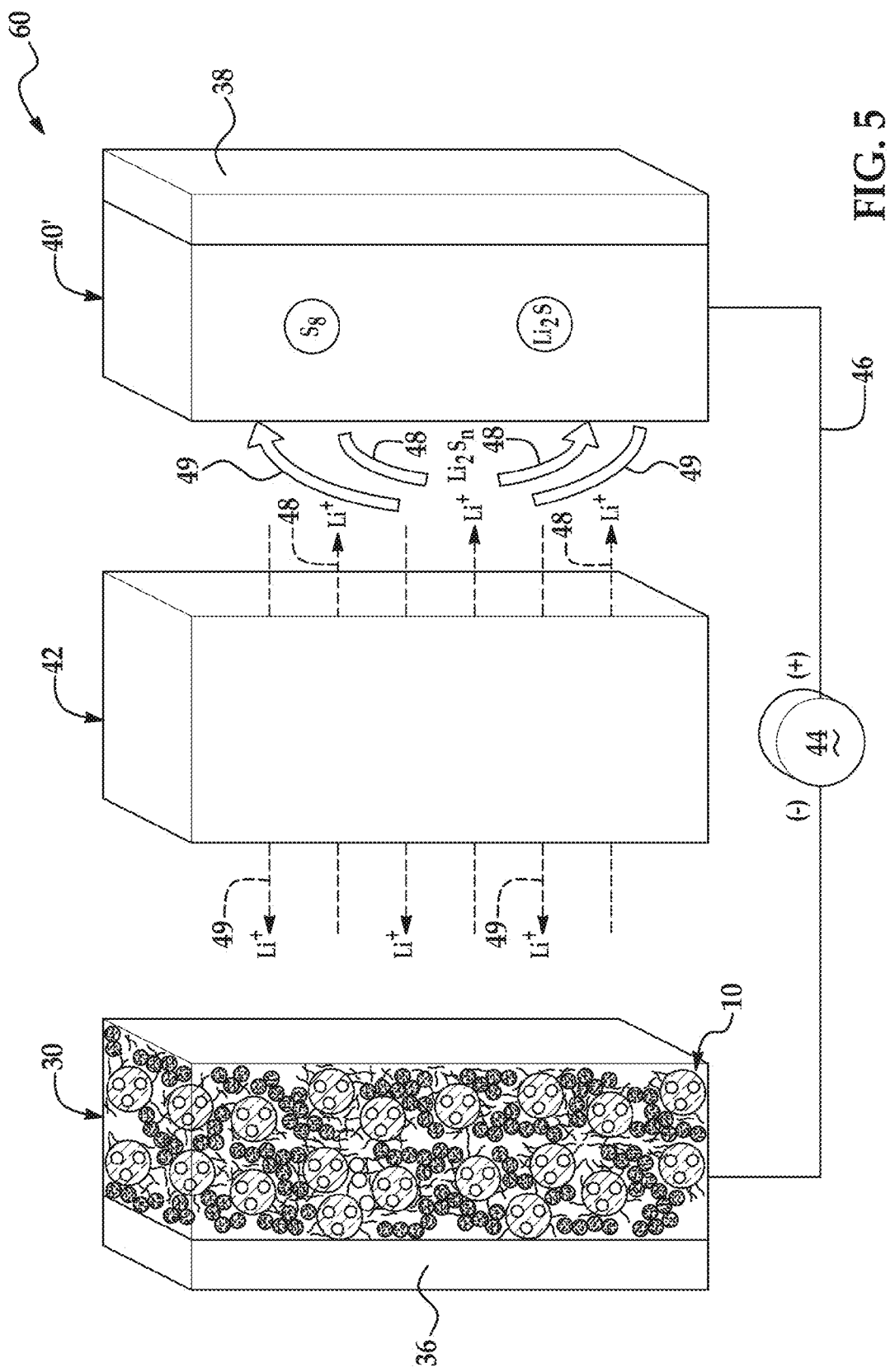
FIG. 5 is a perspective schematic view of an example of a lithium-sulfur battery, including an example of the negative electrode disclosed herein.

When pre-lithiation is complete, the lithiated negative electrode 30 may be rinsed to remove any remaining pre-lithiation electrolyte, and then may be used in either the lithium ion battery 50 (FIG. 4) or the lithium-sulfur battery 60 (FIG. 5).

The active material 10, 10' of the negative electrode 30 can sufficiently undergo lithium insertion and deinsertion. As such, the negative electrode 30 formed on the support 36 (negative-side current collector) may be used in the lithium ion battery 50. It is to be understood that the active materials 10, 10' may be used individually (e.g., 10 alone or 10' alone), or in combination (e.g., 10 and 10') in the negative electrode 30 of the lithium ion battery 50.

As shown in FIG. 4, the lithium ion battery 50 includes, in addition to the negative electrode 30 and the negative side current collector 36, a positive electrode 40, a positive-side current collector 38, and a porous separator 42 positioned between the negative electrode 30 and the positive electrode 40.

In FIG. 4, the positive electrode 40 may be formed from any lithium-based active material that can sufficiently undergo lithium insertion and deinsertion while aluminum or another suitable current collector is functioning as the positive terminal of the lithium ion battery 50. One common class of known lithium-based active materials suitable for the positive electrode 40 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$ or $Li(Ni_xMn_yCo_z)O_4$, or a lithium iron polyanion oxide, such as lithium iron phosphate ($LiFePO_4$) or lithium iron fluoro-phosphate ($Li_2FePO_4F$). Other lithium-based active materials may also be utilized, such as $LiNi_xM_{1-x}O_2$(M is composed of any ratio of Al, Co, and/or Mg), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), $xLi_2MnO_{3-(1-x)}LiMO_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the positive electrode 40 may be intermingled with a polymeric binder and a conductive filler (e.g., high surface area carbon). Any of the binders previously described for the negative electrode 30 may be used in the positive electrode 40. The polymeric binder structurally holds the lithium-based active materials and the high surface area carbon together. An example of the high surface area carbon is acetylene black. The high surface area carbon ensures electron conduction between the positive-side current collector 38 and the active material particles of the positive electrode 40.

The positive-side current collector 38 may be formed from aluminum or any other appropriate electrically conductive material known to skilled artisans.

The porous separator 42 in FIG. 4, which operates as both an electrical insulator and a mechanical support, is sandwiched between the negative electrode 30 and the positive electrode 40 to prevent physical contact between the two electrodes 30, 40 and to prevent the occurrence of a short circuit. In addition to providing a physical barrier between the two electrodes 30, 40, the porous separator 42 ensures passage of lithium ions (identified by the black dots and by the open circles having a (+) charge in FIG. 4) and related anions (identified by the open circles having a (−) charge in FIG. 4) through an electrolyte solution filling its pores. This helps ensure that the lithium ion battery 50 functions properly.

The porous separator 42 may be any of the materials as previously described for the separator in reference to FIG. 1A.

Any appropriate electrolyte solution that can conduct lithium ions between the negative electrode 30 and the positive electrode 40 may be used in the lithium ion battery 50. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 50 as well as how to manufacture or commercially acquire them. The examples of the lithium salts that may be dissolved in an organic solvent to form the non-aqueous liquid electrolyte solution may be the same lithium salts as previously described in reference to FIG. 1A. The organic solvents may be cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIG. 4, the lithium ion battery 50 also includes an interruptible external circuit 46 that connects the negative electrode 30 and the positive electrode 40. The lithium ion battery 50 may also support a load device 44 that can be operatively connected to the external circuit 46. The load device 44 receives a feed of electrical energy from the electric current passing through the external circuit 46 when the lithium ion battery 50 is discharging. While the load device 44 may be any number of known electrically-powered devices, a few specific examples of a power-consuming load device 44 include an electric motor for a hybrid vehicle or an all-electrical vehicle, a laptop computer, a cellular phone, and a cordless power tool. The load device 44 may also, however, be an electrical power-generating apparatus that charges the lithium ion battery 50 for purposes of storing energy. For instance, the tendency of windmills and solar panels to variably and/or intermittently generate electricity often results in a need to store surplus energy for later use.

The lithium ion battery 50 may also include a wide range of other components that, while not depicted here, are nonetheless known to skilled artisans. For instance, the lithium ion battery 50 may include a casing, gaskets, terminals, tabs, and any other desirable components or materials that may be situated between or around the negative electrode 30 and the positive electrode 40 for performance-related or other practical purposes. Moreover, the size and shape of the lithium ion battery 50, as well as the design and chemical make-up of its main components, may vary depending on the particular application for which it is designed. Battery-powered automobiles and hand-held consumer electronic devices, for example, are two instances where the lithium ion battery 50 would most likely be designed to different size, capacity, and power-output specifications. The lithium ion battery 50 may also be connected in series and/or in parallel with other similar lithium ion batteries to produce a greater voltage output and current (if arranged in parallel) or voltage (if arranged in series) if the load device 44 so requires.

The lithium ion battery 50 generally operates by reversibly passing lithium ions between the negative electrode 30 and the positive electrode 40. In the fully charged state, the voltage of the battery 50 is at a maximum (typically in the range 2.0V to 5.0V); while in the fully discharged state, the voltage of the battery 50 is at a minimum (typically in the range 0V to 2.0V). Essentially, the Fermi energy levels of the active materials in the positive and negative electrodes 40, 30 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 44 enables an electronic current flow in the external circuit 46 with a direction such that the difference between the Fermi levels (and, correspondingly, the cell voltage) decreases. The reverse happens during battery charging: the battery charger forces an electronic current flow in the external circuit 46 with a direction such that the difference between the Fermi levels (and, correspondingly, the cell voltage) increases.

At the beginning of a discharge, the negative electrode 30 of the lithium ion battery 50 contains a high concentration of intercalated lithium while the positive electrode 40 is relatively depleted. When the negative electrode 30 contains a sufficiently higher relative quantity of intercalated lithium, the lithium ion battery 50 can generate a beneficial electric current by way of reversible electrochemical reactions that occur when the external circuit 46 is closed to connect the negative electrode 30 and the positive electrode 40. The establishment of the closed external circuit under such circumstances causes the extraction of intercalated lithium from the negative electrode 30. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 40 and the negative electrode 30 (ranging from about 2.0V to about 5.0V, depending on the exact chemical make-up of the electrodes 30, 40) drives the electrons ($e^-$) produced by the oxidation of intercalated lithium at the negative electrode 30 through the external circuit 46 towards the positive electrode 40. The lithium ions are concurrently carried by the electrolyte solution through the porous separator 42 towards the positive electrode 40. The electrons ($e^-$) flowing through the external circuit 46 and the lithium ions migrating across the porous separator 42 in the electrolyte solution eventually reconcile and form intercalated lithium at the positive electrode 40. The electric current passing through the external circuit 46 can be harnessed and directed through the load device 44 until the level of intercalated lithium in the negative electrode 30 falls below a workable level or the need for electrical energy ceases.

The lithium ion battery 50 may be recharged after a partial or full discharge of its available capacity. To charge the lithium ion battery 50 an external battery charger is connected to the positive and the negative electrodes 40, 30, to drive the reverse of battery discharge electrochemical reactions. During recharging, the electrons ($e^-$) flow back towards the negative electrode 30 through the external circuit 46, and the lithium ions are carried by the electrolyte across the porous separator 42 back towards the negative electrode 30. The electrons ($e^-$) and the lithium ions are reunited at the negative electrode 30, thus replenishing it with intercalated lithium for consumption during the next battery discharge cycle.

The external battery charger that may be used to charge the lithium ion battery 50 may vary depending on the size, construction, and particular end-use of the lithium ion battery 50. Some suitable external battery chargers include a battery charger plugged into an AC wall outlet and a motor vehicle alternator.

Referring now to FIG. 5, the lithium-sulfur battery 60 includes the negative electrode 30 with the active material 10 made from the methods disclosed herein. It is to be understood that each of the active material 10, 10' may be used individually, or in combination, in the negative electrode 30 of the lithium-sulfur battery 60.

In FIG. 5, the lithium-sulfur battery 60 contains the negative electrode 30, the negative side current collector 36, a positive electrode 40', a positive-side current collector 38, and a porous separator 42 positioned between the negative electrode 30 and the positive electrode 40'. It is to be understood that the porous separator 42 may be the same type of porous separator that is described in FIG. 1A and that may also be used in the lithium ion battery 50. In addition, the negative current collector 36 and positive current collector 38 described herein for the lithium ion battery 50 may also be used in the lithium-sulfur battery 60.

For the lithium-sulfur battery 60, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt for this electrolyte solution include those lithium salts previously described in reference to FIG. 1A and that are suitable for use in the lithium ion battery 50.

For the lithium-sulfur battery 60, the positive electrode 40' may include any sulfur-based active material that can sufficiently undergo lithium alloying and dealloying with aluminum or another suitable current collector functioning as the positive terminal of the lithium-sulfur battery 60. An example of sulfur-based active material includes a sulfur-carbon composite. In an example, the weight ratio of S to C in the positive electrode 40' ranges from 1:9 to 8:1.

The sulfur-based active material of the positive electrode 40' may be intermingled with any examples of the polymer binder and the conductive filler previously described. The polymer binder structurally holds the sulfur-based active material and the conductive filler together. The conductive filler ensures electron conduction between the positive-side current collector 38 and the sulfur-based active material.

The positive and negative electrodes 40', 30 are in contact, respectively, with current collectors 38, 36. The negative-side current collector 36 collects and moves free electrons to and from the external circuit 46. The positive-side current collector 38 collects and moves free electrons to and from the external circuit 46.

The lithium-sulfur battery 60 may support a load device 44 that can be operatively connected to the external circuit 46. The load device 44 receives a feed of electrical energy from the electric current passing through the external circuit 46 when the lithium-sulfur battery 60 is discharging. While the load device 44 may be any number of known electrically-powered devices, a few specific examples of a power-consuming load device include an electric motor for a hybrid vehicle or an all-electrical vehicle, a laptop computer, a cellular phone, and a cordless power tool. The load device 44 may also, however, be an electrical power-generating apparatus that charges the lithium-sulfur battery 60 for purposes of storing energy. For instance, the tendency of windmills and solar panels to variably and/or intermittently generate electricity often results in a need to store surplus energy for later use.

The lithium-sulfur battery 60 can include a wide range of other components that, while not depicted here, are nonetheless known to skilled artisans. For instance, the lithium-sulfur battery 60 may include a casing, gaskets, terminals, tabs, and any other desirable components or materials that may be situated between or around the negative electrode 30 and the positive electrode 40' for performance-related or other practical purposes. Moreover, the size and shape of the lithium-sulfur battery 60, as well as the design and chemical make-up of its main components, may vary depending on the particular application for which it is designed. Battery-powered automobiles and hand-held consumer electronic devices, for example, are two instances where the lithium-sulfur battery 60 would most likely be designed to different size, capacity, and power-output specifications. The lithium-sulfur battery 60 may also be connected in series and/or in parallel with other similar lithium-sulfur batteries 60 to produce a greater voltage output and current (if arranged in parallel) or voltage (if arranged in series) if the load device 44 so requires.

The lithium-sulfur battery 60 can generate a useful electric current during battery discharge (shown by reference numeral 48 in FIG. 5). During discharge, the chemical processes in the battery 60 include lithium ($Li^+$) dissolution from the surface of the negative electrode 30 and incorporation of the lithium cations into alkali metal polysulfide salts (i.e., $Li_2S_n$, such as $Li_2S_8$, $Li_2S_6$, $Li_2S_4$, $Li_2S_2$, and $Li_2S$) in the positive electrode 40'. As such, polysulfides are formed (sulfur is reduced) on the surface of the positive electrode 40' in sequence while the battery 60 is discharging. The chemical potential difference between the positive electrode 40' and the negative electrode 30 (ranging from approximately 1.5 to 3.0 volts, depending on the exact chemical make-up of the electrodes 30, 40') drives electrons produced by the dissolution of lithium at the negative electrode 30 through the external circuit 46 towards the positive electrode 40'. The resulting electric current passing through the external circuit 46 can be harnessed and directed through the load device 44 until the lithium in the negative electrode 30 is depleted or falls below a workable level, and the capacity of the lithium-sulfur battery 60 is diminished.

The lithium-sulfur battery 60 can be charged or re-powered at any time by applying an external power source to the lithium-sulfur battery 60 to reverse the electrochemical reactions that occur during battery discharge. During charging (shown at reference numeral 49 in FIG. 5), lithium plating to the negative electrode 30 takes place, and sulfur formation at the positive electrode 40' takes place. The connection of an external power source to the lithium-sulfur battery 60 compels the otherwise non-spontaneous oxidation of lithium at the positive electrode 40' to produce electrons and lithium ions. The electrons, which flow back towards the negative electrode 30 through the external circuit 46, and the lithium ions ($Li^+$), which are carried by the electrolyte across the porous separator 42 back towards the negative electrode 30, reunite at the negative electrode 30 and replenish it with lithium for consumption during the next battery discharge cycle. The external power source that may be used to charge the lithium-sulfur battery 60 may vary depending on the size, construction, and particular end-use of the lithium-sulfur battery 60. Some suitable external power sources include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosure.

EXAMPLES

Example 1

$SiO_x$ powder was incorporated into pores of a porous copper substrate to form a working electrode. The working electrode was incorporated into an electrochemical cell including a lithium metal counter/reference electrode and an electrolyte of ethylene carbonate (EC)-diethyl carbonate (DEC) (1:1 v:v) with 10% fluoroethylene carbonate (FEC) and 1M $LiPF_6$. A voltage of 0.8 volts vs. $Li/Li^+$ was applied to the cell in order to reduce and lithiate the $SiO_x$ powder. The voltage was held for about 100 hours. The reaction formed silicon particles with lithium oxide therein.

The silicon particles, with lithium oxide therein, were rinsed and mixed with water to form a dispersion. The rinsing process also leached the lithium oxide from the silicon particles, creating pores in the silicon particles. The porous silicon particles were isolated from the dispersion using centrifugation.

Figure 6A:
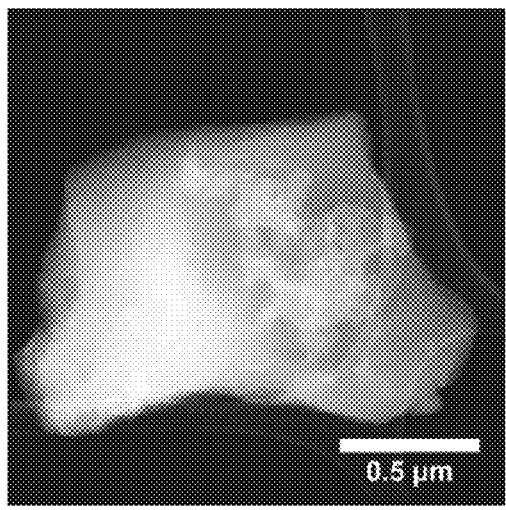
FIGS. 6A-6C are transmission electron microscope ("TEM") images, taken at magnifications of 36K, 20K, and 230K respectively, of the $SiO_x$ (0<x<2) particles (FIG. 6A), the porous silicon particles formed via an example of the method disclosed herein (FIG. 6B), and the porous silicon particles of FIG. 6B using a scalar bar of 100 nm.
Figure 6B:
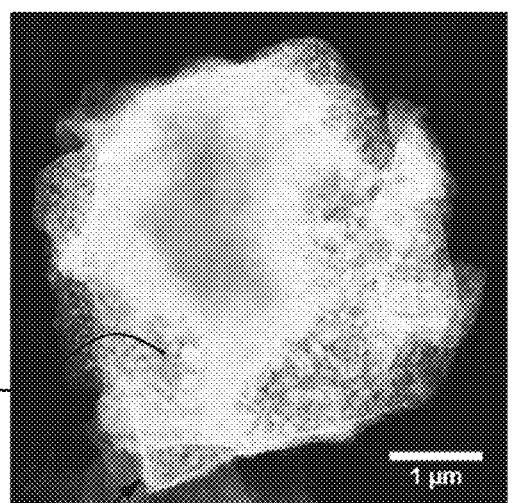
Figure 6C:
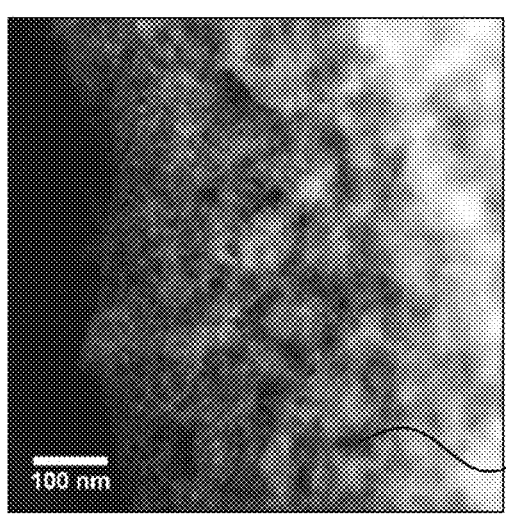

TEM images of the starting $SiO_x$ powder and the resulting porous silicon particles were taken. FIG. 6A is the TEM of the $SiO_x$ powder 12. FIGS. 6B and 6C are TEMS of the porous silicon particles 10. The dark spots in FIGS. 6B and 6C clearly show the pores 22 that were formed as a result of the example of the method disclosed herein.

Example 2

The porous silicon particles of Example 1 were used as an active material to form a negative electrode and untreated $SiO_x$ powder was used as the active material to form a comparative negative electrode. In particular, respective slurries were formed by adding 80 wt % (of the total solids) of the porous silicon particles of Example 1 or the $SiO_x$ powder to 10 wt % (of the total solids) of carbon black as the conductive filler, 10 wt % (of the total solids) of sodium alginate as the polymeric binder, and water. Each slurry was cast on a respective copper current collector and dried by exposure to a vacuum at 80° C. for about 10 hours to remove the water and form the example and comparative electrodes.

Each electrode was cut into a 10 cm (in diameter) disk for use as a single electrode in a respective coin cell. In the single electrodes, the loading of the respective active materials was about 1 mg/cm².

The example coin cell included the single electrode formed with the porous silicon particles and a lithium foil counter electrode. The comparative example coin cell included the single electrode formed with the untreated $SiO_x$ powder and a lithium foil counter electrode. Each of the example and comparative coin cells was prepared with an electrolyte of EC-DEC (1:1 v:v) with 10% FEC and 1M $LiPF_6$.

The example and comparative coin cells were held at 25° C. to perform electrochemical cycling tests. The cycling tests were carried out at a rate of C/10, and the coin cells were cycled within the voltage window of 0.05V to 1V for at least 100 cycles.

Figure 7:
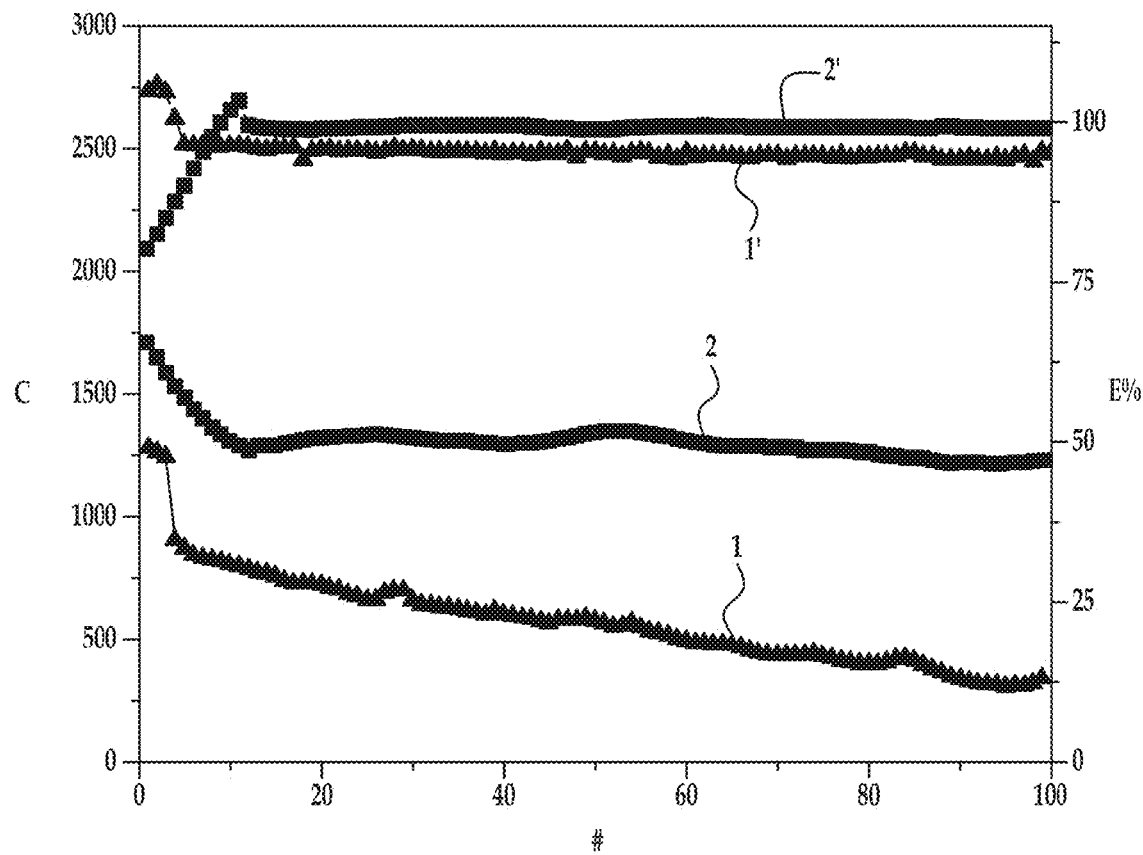
FIG. 7 is a graph exhibiting the cycling stability, in terms of capacity retention and efficiency, of a coin cell including a negative electrode formed with an example of the porous silicon particles disclosed herein and of a comparative coin cell including a negative electrode formed with $SiO_x$ (0<x<2) powder.

FIG. 7 depicts the charge capacity (mAh/g) (Y axis labeled "C" on the left side) versus the cycle number (X axis labeled "#") for the coin cells. The charge capacity of the example coin cell is labeled "2" and the charge capacity of the comparative coin cell is labeled "1". FIG. 7 also depicts the columbic efficiency (%) (Y axis labeled "E %" on the right side) of the cells, where the efficiency of the example coin cell is labeled "2'" and the efficiency of the comparative coin cell is labeled "1'").

As illustrated in FIG. 7, the cycling stability of the example coin cell during a repeated lithiation and delithiation process was improved compared to the comparative example coin cell. In particular, the discharge capacity (2) of the example coin cell is much higher than the discharge capacity (1) of the comparative coin cell over all of the cycles. The efficiency (2') of the example coin cell improved over the first 10 cells and then was better than the efficiency (1') of the comparative coin cell over the remaining cycles. In addition, the efficiency (1') of the comparative coin cell declined at least over the first 5 cycles. It is believed that the cycling stability of the example coin cell is improved, in part, because of pores in the porous silicon particles. The pores allow the active material to better accommodate silicon expansion during cycling, thus preventing or at least reducing fracturing, decrepitating, or mechanical degradation of the active material in the example coin cell.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.2 volts to about 0.8 volts should be interpreted to include not only the explicitly recited limits of from about 0.2 volts to about 0.8 volts, but also to include individual values, such as 0.3 volts, 0.4 volts, 0.75 volts, etc., and sub-ranges, such as from about 0.5 volts to about 0.7 volts, etc. Furthermore, when "about" is utilized to describe a value, this is meant to encompass minor variations (up to +/−5 nm) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for forming a porous material, the method comprising:
   combining $SiO_x$ ($0<x<2$) particles with a lithium metal;
   causing the $SiO_x$ ($0<x<2$) particles and the lithium metal to react to form lithium oxide nanoparticles in a silicon matrix; and
   removing at least some of the lithium oxide nanoparticles from the silicon matrix, thereby forming porous silicon particles.

2. The method as defined in claim 1 wherein the causing results in lithium silicate nanoparticles to form in the silicon matrix;
   and the removing further includes removing at least some of the lithium silicate nanoparticles from the silicon matrix.

3. The method as defined in claim 2 wherein the removing of at least some of the lithium oxide nanoparticles and the removing of at least some of the lithium silicate nanoparticles includes any of:
   i) exposing the silicon matrix to deionized water, ethanol, or a combination thereof, thereby leaching at least some of the lithium oxide nanoparticles from the silicon matrix; and
   exposing the silicon matrix to a diluted acid, thereby etching at least some of the lithium silicate nanoparticles from the silicon matrix and forming a dispersion containing the porous silicon particles, wherein the diluted acid is selected from the group consisting of HCl, $H_2SO_4$, $HNO_3$, $H_3PO_4$, and combinations thereof; or
   ii) exposing the silicon matrix to a diluted acid, thereby etching at least some of the lithium oxide nanoparticles and at least some of the lithium silicate nanoparticles from the silicon matrix and forming a dispersion containing the porous silicon particles, wherein the diluted acid is selected from the group consisting of HCl, $H_2SO_4$, $HNO_3$, $H_3PO_4$, and combinations thereof;
   and wherein the method further comprises isolating the porous silicon particles using centrifugation or ultrasonic waves.

4. The method as defined in claim 1 wherein the causing includes applying a voltage, ranging from about 0.2 volts to 0.8 volts versus a Li/Li$^+$ reference electrode, to an electrochemical cell including an electrolyte solution, the lithium metal as a counter electrode, and a current collector, wherein the $SiO_x$ ($0<x<2$) particles and the current collector are in electrical contact to form a working electrode, thereby lithiating the $SiO_x$ ($0<x<2$) particles to form the lithium oxide nanoparticles in the silicon matrix.

5. The method as defined in claim 4 wherein:
   the current collector is selected from the group consisting of a metal container, metal foil, and a metal cup, wherein the metal of the container, the foil, or the cup is selected from the group consisting of copper, nickel, titanium, platinum, gold, silver, magnesium, aluminum, vanadium, and alloys thereof; and
   the current collector includes the electrolyte solution, the lithium metal as the counter electrode, the reference electrode, and the $SiO_x$ ($0<x<2$) particles therein.

6. The method as defined in claim 4 wherein:
   the current collector is a porous structure selected from the group consisting of copper, nickel, titanium, platinum, gold, silver, aluminum, magnesium, vanadium, and alloys thereof; and
   the working electrode is formed by introducing the $SiO_x$ ($0<x<2$) particles into the porous structure;
   and the method further comprises placing the working electrode into the electrolyte solution with the lithium metal as the counter electrode.

7. The method as defined in claim 4 wherein the electrochemical cell further includes a separator positioned between the working electrode and the counter electrode.

8. The method as defined in claim 4 wherein the voltage is applied for a time ranging from about 1 minute to about 100 hours.

9. The method as defined in claim 4 wherein the Li/Li$^+$ reference electrode and the counter electrode are a single counter/reference electrode.

10. The method as defined in claim 1 wherein the combining includes mixing the $SiO_x$ ($0<x<2$) particles with the lithium metal at a ratio of the $SiO_x$ ($0<x<2$) particles to the lithium metal being 1:2X where X is equal to x of the $SiO_x$ ($0<x<2$) particles; and wherein the causing includes heating the $SiO_x$ ($0<x<2$) particles and the lithium metal to a temperature greater than 100° C.

11. The method as defined in claim 1 wherein the removing of the lithium oxide nanoparticles includes any of:
    i) exposing the silicon matrix to deionized water, ethanol, or a combination thereof, thereby leaching at least some of the lithium oxide nanoparticles from the silicon matrix and forming a dispersion containing the porous silicon particles; or
    ii) exposing the silicon matrix to a diluted acid, thereby etching at least some of the lithium oxide nanoparticles from the silicon matrix and forming the dispersion containing the porous silicon particles, wherein the diluted acid is selected from the group consisting of HCl, H—$_2SO_4$, $HNO_3$, $H_3PO_4$, and combinations thereof;
    and wherein the method further comprises isolating the porous silicon particles using centrifugation or ultrasonic waves.

12. The method as defined in claim 1, further comprising applying an electrically conductive coating to the porous silicon particles, wherein the electrically conductive coating is selected from the group consisting of a graphitic carbon coating and a nitride based coating.

13. The method as defined in claim 12 wherein the electrically conductive coating is applied using chemical vapor deposition or atomic layer deposition.

14. The method as defined in claim 1, further comprising:
    forming a lithium battery negative electrode including:
       the porous silicon particles as a negative electrode active material of the lithium battery negative electrode;
       a binder; and
       a conductive material; and
    applying a conductive coating to a surface of the lithium battery negative electrode.

15. The method as defined in claim 1 wherein no hydrofluoric acid is used during the method of forming the porous material.

16. The method as defined in claim 1, further comprising adding the porous silicon particles as a negative electrode active material to a negative electrode dispersion.

17. The method as defined in claim 16, further comprising:
applying the negative electrode dispersion to a current collector; and
removing any solvent from the negative electrode dispersion to form a lithium battery negative electrode on the current collector.

18. The method as defined in claim 17, further comprising incorporating the lithium battery negative electrode into a lithium ion battery or a lithium-sulfur battery.

19. The method as defined in claim 18 wherein the lithium-sulfur battery further includes:
a sulfur-based positive electrode; and
an other electrolyte solution, the other electrolyte solution including an ether based solvent and a lithium salt dissolved in the ether based solvent, the ether based solvent being selected from the group consisting of 1,3-dioxolane, tetrahydrofuran, 2-methyltetrahydrofuran, 1,2-dimethoxyethane, 1-2-diethoxyethane, ethoxymethoxyethane, tetraethylene glycol dimethyl ether (TEGDME), polyethylene glycol dimethyl ether (PEGDME), and combinations thereof; and the lithium salt being selected from the group consisting of $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, and mixtures thereof.

20. The method as defined in claim 18 wherein the lithium ion battery further includes:
a lithium-based positive electrode; and
an other electrolyte solution, the other electrolyte solution including an organic based solvent and a lithium salt dissolved in the organic based solvent, the organic based solvent being selected from the group consisting of carbonates, linear carbonates, aliphatic carboxylic esters, γ-lactones, chain structure ethers, cyclic ethers, and combinations thereof, and the lithium salt being selected from the group consisting of $LiClO_4$, $LiAlCl_4$, LiI, LiBr, LiSCN, $LiBF_4$, $LiB(C_6H_5)_4$, $LiCF_3SO_3$, $LiN(FSO_2)_2$, $LiN(CF_3SO_2)_2$, $LiAsF_6$, $LiPF_6$, LITFSI, $LiB(C_2O_4)_2$ (LiBOB), $LiBF_2(C_2O_4)$ (LiODFB), $LiPF_4(C_2O_4)$ (LiFOP), $LiNO_3$, and combinations thereof.

* * * * *